United States Patent
Keisuke

[15] 3,656,042
[45] Apr. 11, 1972

[54] AUTOMATIC COMBINATION WINDSHIELD WIPER-WASHER
[72] Inventor: Murakami Keisuke, Tokyo, Japan
[73] Assignee: John Y. Sugihara, Streamwood, Ill.
[22] Filed: Apr. 14, 1971
[21] Appl. No.: 133,871

[52] U.S. Cl. ........................................318/444, 15/250.02
[51] Int. Cl. ..................................................B60s 1/46
[58] Field of Search..........................318/443, 444, DIG. 2; 15/250.02, 250.13

[56] References Cited

UNITED STATES PATENTS

| | | | |
|---|---|---|---|
| 3,147,504 | 9/1964 | Oishei | 15/250.02 |
| 3,181,194 | 5/1965 | Daykin | 15/250.02 |
| 3,383,730 | 5/1968 | Lamaudiere | 15/250.02 |
| 3,407,345 | 10/1968 | Fruehauf | 318/443 |

Primary Examiner—Bernard A. Gilheany
Assistant Examiner—Thomas Langer
Attorney—Dressler, Goldsmith, Clement & Gordon

[57] ABSTRACT

In a motor vehicle, a circuit for selectively and automatically controlling the operation of the vehicle's windshield wipers and windshield washers including an astable multivibrator circuit which generates wiper control pulses, both the duration of which pulses and the interval therebetween being variable. Each wiper control pulse energizes a wiper control relay, the contacts of which, when closed, energize a wiper motor to initiate operation of the windshield wipers. Simultaneously with each wiper control pulse, the astable multivibrator also generates a pulse inverted with respect thereto. A monostable vibrator multivibrator is connected to receive the inverted pulse from the astable multivibrator through a selectively operable manual switch. The inverted pulses are differentiated, and the resulting impulses trigger the washer control monostable multivibrator which generates a washer control pulse in response to each impulse. A washer control relay is energized by each washer control pulse for the duration of each said washer control pulse to close associated contacts connected across a washer pump motor thereby energizing the windshield washer pump.

8 Claims, 3 Drawing Figures

Patented April 11, 1972 3,656,042

INVENTOR
KEISUKE MURAKAMI
BY
Dressler, Goldsmith, Clement & Gordon
ATTORNEYS 3,656,042

AUTOMATIC COMBINATION WINDSHIELD WIPER-WASHER

BACKGROUND OF THE INVENTION

One of the persistent problems in vehicles, particularly automobiles, is the maintenance of a clean windshield on those days when the weather conditions are misty or when a light rain or drizzle exists. Under these conditions, continuous operation of the windshield wipers is unnecessary to maintain the windshield clear, and, in fact, is often undesirable since such continuous operation often results in the wiping of a relatively dry windshield resulting in streaking of the windshield and other deleterious effects.

To overcome this problem, the operator of such vehicles may manually operate the wipers for short periods of time in order to clean the windshield while attempting to reduce streaking and wiping of dry windshields. Such a procedure is not only aggravating but in many occasions unsafe by detracting the attention of the operator.

Even under such circumstances, there are occasions when the wipers still do not function satisfactorily because of what is being deposited on the windshield, e.g., a spray off the road from the vehicles immediately ahead. This type of spray dirties the windshield, and the wipers themselves are often unable to clean the windshield. As a result, the windshield washers must be manually operated to supplement the wipers.

It can be appreciated that automatic control of the wipers and windshield washers to accommodate this type of aggravating situation would be highly desirable not only because of the convenience involved, but more important, because of the increased safety resulting from the elimination of manual operation of the wipers and washers by the driver and resulting diversion of his attention.

SUMMARY OF THE INVENTION

In accordance with the present invention there is provided a windshield wiper-washer control circuit for automatically and selectively operating both the windshield wiper itself or together with the windshield washer at desired periodic intervals in order to eliminate the necessity of the driver manually operating one or both of these mechanisms manually.

The circuit of the present invention includes a wiper control circuit which, when energized by closure of an on-off switch, operates as an astable pulse generator. The wiper control circuit includes means for adjusting both the duration of the wiper control pulses and for adjusting the interval between each of the pulses.

Wiper control switch operating means, such as a relay, is energized by each wiper control pulse to close an associated switch to energize the wiper motor and thereby operate the windshield wipers for approximately the duration of each wiper control pulse.

When it is desired and necessary to operate the windshield washer in conjunction with the wipers, an inverted output of the wiper control circuit is utilized to trigger a washer control circuit, which operates as a monostable pulse generator. The monostable pulse generator is connected to and is triggered by the differentiated inverted output of the wiper control circuit, typically in the form of impulses, through a manually operated switch.

The washer control monostable pulse generator generates a washer control pulse in response to the differentiated inverted output of the wiper control circuit, the duration of this washer control pulse being adjustable. Washer control switch operating means, such as a relay, is energized by each washer control pulse to close an associated switch to energize a washer pump motor for the duration of said washer control pulse and cause the windshield washers to operate for this time period.

Numerous other advantages and features of the present invention will become readily apparent from the following detailed description of the invention and of one embodiment thereof, from the claims and from the accompanying drawings in which each and every detail shown is fully and completely disclosed as a part of this specification, in which like numerals refer to like parts.

DETAILED DESCRIPTION OF ONE EMBODIMENT

Figure 1:
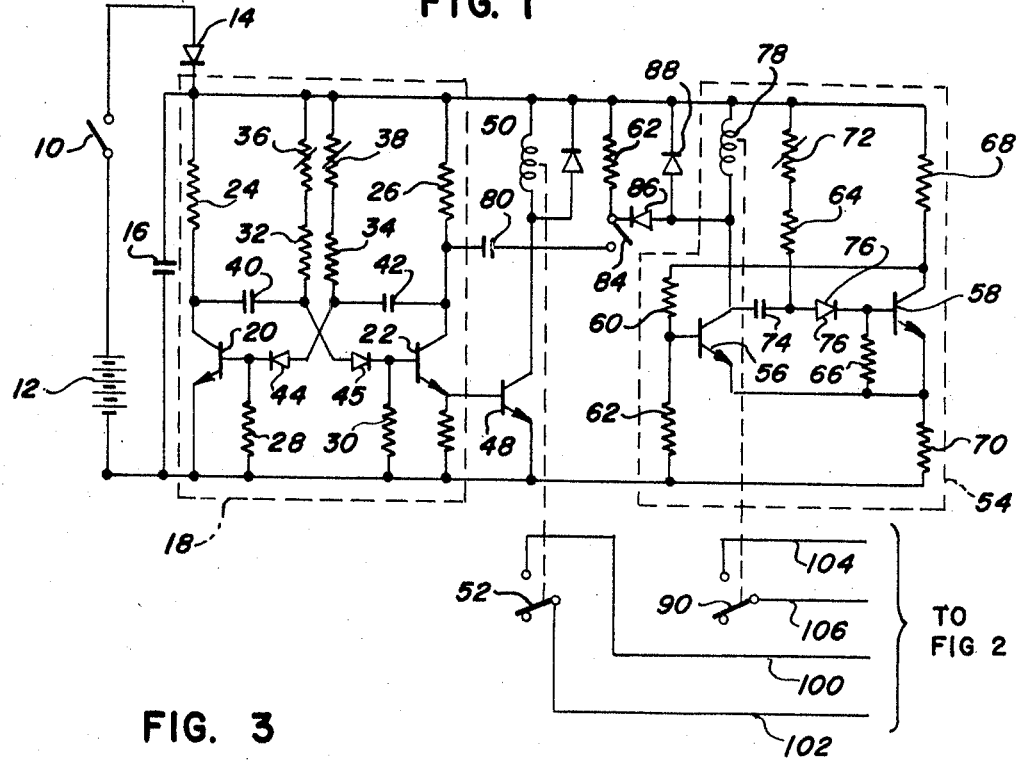
FIG. 1 is an electrical schematic diagram of the control circuit incorporated in the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

In the control circuit, closure of the input switch 10 applies a voltage from the battery 12 through an input circuit consisting of diode 14 and capacitor 16 to the wiper control astable multivibrator 18.

The astable multivibrator 18 includes a pair of transistors 20 and 22, resistors 24, 26, 28, 30, 32 and 34, adjustable resistors 36 and 38, capacitors 40 and 42 and diodes 44 and 46.

The output of the wiper control astable multivibrator 18, a plurality of wiper control pulses, is taken off the emitter of transistor 22 and applied to the base of an output switching and power transistor 48 connected in series with a wiper control relay 50.

The duration of each of the wiper control pulses is determined by the value of resistor 34, adjustable resistor 38 and capacitor 42, the pulse duration being varied by adjusting the value of adjustable resistor 38. The time interval between the wiper control pulses is determined by the values of resistor 32, adjustable resistor 36 and capacitor 40, the time interval between pulses being varied by adjusting the resistance of adjustable resistor 36.

The positive pulses applied to the base of the output power and switching transistor 48 causes that transistor to conduct and to energize the wiper control relay 50 to close the wiper control relay contacts 52 for initiating operation of the windshield wiper motor as described below.

There is also provided a washer control circuit including a monostable multivibrator 54 shown as including transistors 56 and 58, resistors 60, 62, 64, 66, 68 and 70, adjustable resistor 72, capacitor 74, diode 76 and washer control relay 78 connected to the collector of transistor 56.

A differentiating circuit including capacitor 80 and resistor 82 is connected to the collector of transistor 22 to provide a negative impulse in response to a drop in voltage at the collector of transistor 22, which occurs simultaneously with the wiper control pulse generated at the emitter of the transistor 22.

When it is desired to operate the washer automatically, manually operable switch 84 is closed to connect the input of the monostable multivibrator 54 to the inverted output of the astable multivibrator 18 through the differentiator 81. The differentiated negative impulses coupled to the monostable multivibrator 54 through diodes 86 and 88 triggers the monostable multivibrator 54 causing transistor 56 to conduct thereby energizing washer control relay 78. Washer control relay, when energized, causes its contacts 90 to close to energize the washer pump motor.

Figure 2:
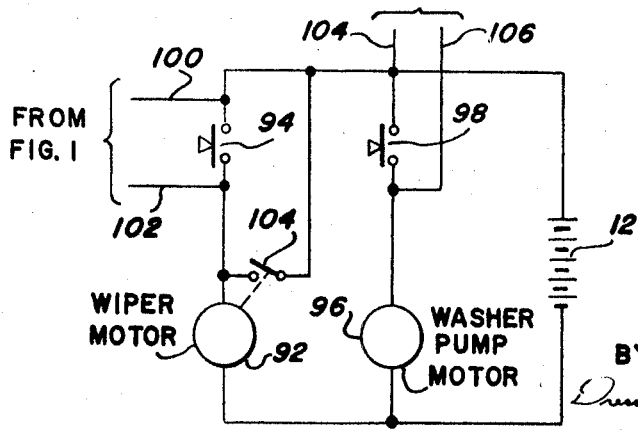
FIG. 2 is an electric schematic diagram showing the connections of the outputs from the circuit of FIG. 1 to the wiper and washer motors.

Referring to FIG. 2, there is shown schematically a wiper motor 92 connected in series with a manual operating switch 94 and battery 12. A washer pump motor 96 is also connected across the battery 12 in series with a manual washer switch 98. The wiper control relay contacts 52 are connected across the wiper manual switch 94 by lines 100, 102. Similarly, the washer control relay contacts 90 are connected across the washer manual start switch 98 by lines 104, 106.

Thus, when the wiper control relay 50 is energized closing its contacts 52, the wiper motor 92 is energized to operate the windshield wipers. The wiper motor will continue to operate so long as the contacts 52 are closed. When the contacts 52 are opened, upon termination of each wiper control pulse, the wipers will return to their off position at which time the cycle hold switch 104 will open to de-energize the wiper motor 92, as is well known.

Similarly, when the washer control relay 78 is energized closing its contacts 90, the washer pump motor 96 is energized to operate the windshield washer pump for so long as the contacts 90 remain closed, i.e., for the duration of the washer control pulse.

Figure 3:
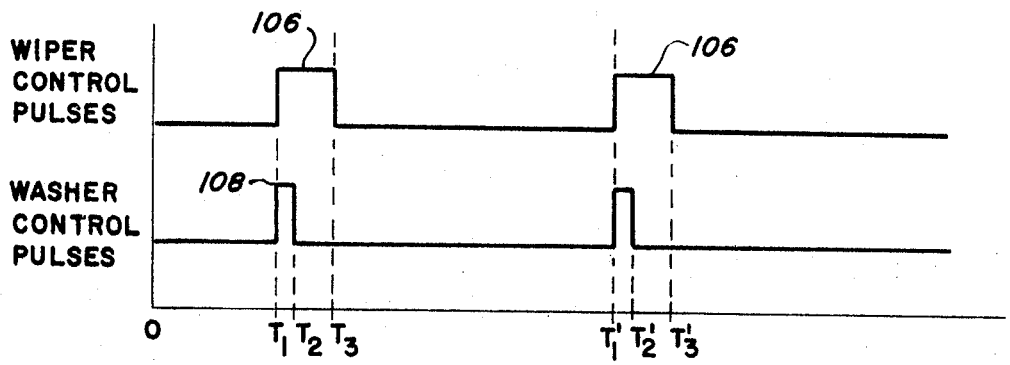
FIG. 3 is a timing diagram showing the relationship of the pulses generated in accordance with the present invention.

FIG. 3 shows a timing diagram for the washer control pulses and the wiper control pulses. Typically, the duration of the wiper control pulses 106, $T_1$ to $T_3$, ranges from 3 to 6 seconds and the interval between these pulses, $T_3 - T_1$ may be adjusted from about 5 seconds to about 50 seconds. The duration of the washer control pulses 108, $T_1 - T_2$ typically ranges between about 1 second and about 3 seconds, and is normally less than the duration of the wiper control pulses 106.

Thus, there has been disclosed a circuit which automatically and intermittently can operate windshield wipers on a vehicle for a selected period of time at varying intervals and which can selectively and automatically initiate simultaneous operation of the windshield washers concurrently with the wipers.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. In a motor vehicle having windshield wipers operated by a windshield wiper motor and windshield washers operated by a windshield washer pump motor, a circuit for automatically and intermittently operating said windshield wiper motor and windshield washer pump motor comprising: astable pulse generating means for continuously generating a plurality of wiper control pulses; wiper control switch operating means connected to said astable pulse generating means and adapted to be energized in response to and for the duration of each of said wiper control pulses; normally open wiper control switch means closing in response to and for the duration of the energization of said wiper control switch operating means; monostable pulse generating means adapted to be connected to said astable pulse generating means and when so connected generating a washer control pulse in response to the occurrence of each wiper control pulse; selectively operable switch means for connecting said monostable pulse generating means to said astable pulse generating means; washer control switch operating means connected to said monostable pulse generating means and adapted to be energized in response to and for the duration of each washer control pulse; normally open washer control switch means closing in response to and for the duration of the energization of said wiper control switch operating means; said wiper motor being connected to said wiper control switch means and operating in response to the closure thereof; and said washer pump motor being connected to said washer control switch means and operating in response to the closure thereof.

2. A circuit as claimed in claim 1 wherein said astable pulse generating means includes first adjustable circuit means operable to vary the duration of said wiper control pulses, and second adjustable circuit means operable to vary the interval between said wiper control pulses.

3. A circuit as claimed in claim 2 wherein said monostable pulse generating means includes third adjustable circuit means operable to vary the duration of said washer control pulses.

4. A circuit as claimed in claim 3 wherein the duration of said washer control pulses is adjusted to be less than the duration of said wiper control pulses.

5. A circuit as claimed in claim 1 wherein said monostable pulse generating means is connected to said astable pulse generating means through said selectively operable switch means to receive inverted wiper control output pulses generated by said astable pulse generating means.

6. A circuit as claimed in claim 5 including pulse differentiating means connected to receive said inverted pulses and generating an impulse in response to each of said inverted pulses, said monostable pulse generator being connected to receive said impulses.

7. The circuit as claimed in claim 1 wherein said astable pulse generator means is a free running multivibrator, said multivibrator having a first and second transistor, a first adjustable resistor connected to the base of said first transistor for adjusting the duration of said wiper control pulses, a second adjustable resistor connected to the base of said second transistor for adjusting the interval between said wiper control pulses, and an amplifier circuit connected to the output of said second transistor, said amplifier circuit including said control switch operating means in series therewith, said amplifier circuit energizing said wiper control switch operating means in response to each wiper control pulse generated by said free running multivibrator.

8. A circuit as claimed in claim 7 wherein said monostable pulse generator is a monostable multivibrator, and including a differentiating circuit connected to the inverted output of said astable multivibrator, said monostable multivibrator connected to the output of said differentiator through a manually operated switch means, said monostable multivibrator generating a washer control pulse in response to each differentiated inverted pulse generated by said astable multivibrator.

* * * * *